(12) United States Patent
Barthelme et al.

(10) Patent No.: US 12,372,118 B2
(45) Date of Patent: Jul. 29, 2025

(54) BEARING ASSEMBLY, IN PARTICULAR FOR AN ELECTRIC MOTOR

(71) Applicant: AKTIEBOLAGET SKF, Gothenburg (SE)

(72) Inventors: Juergen Barthelme, Grettstadt (DE); Helmut Hauck, Euerbach (DE); Stefanie Seufert, Rothhausen (DE); Hubert Herbst, Gädheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 111 days.

(21) Appl. No.: 18/320,054

(22) Filed: May 18, 2023

(65) Prior Publication Data

US 2023/0400060 A1  Dec. 14, 2023

(30) Foreign Application Priority Data

Jun. 8, 2022  (DE) .......................... 102022205790.2

(51) Int. Cl.
*F16C 35/07*  (2006.01)
*F16C 33/58*  (2006.01)
(Continued)

(52) U.S. Cl.
CPC .......... *F16C 35/077* (2013.01); *F16C 33/586* (2013.01); *F16C 37/007* (2013.01); *F16C 2223/30* (2013.01)

(58) Field of Classification Search
CPC ...... F16C 19/52; F16C 19/525; F16C 33/586; F16C 35/067; F16C 35/073; F16C 35/077;
(Continued)

(56) References Cited

U.S. PATENT DOCUMENTS 2,283,839 A   5/1942   Wright
3,447,846 A   6/1969   Marsh
(Continued)

FOREIGN PATENT DOCUMENTS

DE   102007060968 A1   7/2008
DE   102020106338 A1 * 9/2021
(Continued)

OTHER PUBLICATIONS

Machine Translation of FR-3036884-A1 (Year: 2016).*
(Continued)

*Primary Examiner* — Alan B Waits

(74) *Attorney, Agent, or Firm* — J-TEK LAW PLLC; Scott T. Wakeman; Mark A. Ussai

(57) ABSTRACT

A bearing assembly includes a bearing having a first bearing ring, a second bearing ring rotatably disposed relative to the first bearing ring, and a plurality of rolling elements in a bearing interior defined by the first bearing ring and the second bearing ring. Also, at least one layer of non-metallic material on the first bearing ring configured to conduct heat away from the first bearing ring and to electrically insulate the first bearing ring and to fill at least one cavity between the first bearing ring and a component to which the first bearing ring is mounted. The at least one layer may be a first layer of a heat-conducting material and a second layer of a different, electrically insulating material.

10 Claims, 4 Drawing Sheets

(51) Int. Cl.
  *F16C 35/077* (2006.01)
  *F16C 37/00* (2006.01)
(58) Field of Classification Search
  CPC .... F16C 37/00; F16C 37/007; F16C 2202/20; F16C 2202/30; F16C 2223/30; H02K 5/173–1737
  See application file for complete search history.

(56) References Cited

U.S. PATENT DOCUMENTS

| | | | |
|---|---|---|---|
| 2019/0226526 A1* | 7/2019 | Hubert | F16C 19/16 |
| 2020/0047795 A1 | 2/2020 | Falossi et al. | |
| 2022/0094237 A1* | 3/2022 | Kisch | H02K 9/227 |

FOREIGN PATENT DOCUMENTS

| | | | |
|---|---|---|---|
| EP | 0417744 B1 | 1/1995 | |
| FR | 3036884 A1 * | 12/2016 | H02K 1/16 |
| JP | H04210124 A | 7/1992 | |
| JP | H1037949 A | 2/1998 | |
| JP | 2005320983 A | 11/2005 | |
| JP | 2008057568 A | 3/2008 | |
| WO | 2019156050 A1 | 8/2019 | |

OTHER PUBLICATIONS

Machine Translation of DE-102020106338-A1 (Year: 2021).*
Unpublished U.S. Appl. No. 18/084,812, first named inventor: Benoit Arnault; filed Dec. 20, 2022.
Unpublished U.S. Appl. No. 18/084,824, first named inventor: Benoit Arnault; filed Dec. 20, 2022.
Unpublished U.S. Appl. No. 18/084,834, first named inventor: Benoit Arnault; filed Dec. 20, 2022.
Unpublished U.S. Appl. No. 18/084,840, first named inventor: Benoit Arnault; filed Dec. 20, 2022.

* cited by examiner

BEARING ASSEMBLY, IN PARTICULAR FOR AN ELECTRIC MOTOR

CROSS-REFERENCE

This application claims priority to German patent application no. 10 2022 205 790.2 filed on Jun. 8, 2022, the contents of which are fully incorporated herein by reference.

TECHNOLOGICAL FIELD

The present invention relates to an insulated bearing assembly that can be used in electric motors, electrical machines, and related equipment.

BACKGROUND

An electric motor or an electrical machine usually includes a rotatable shaft and a housing receiving the components of the electric motor and the shaft. In order to support the rotatable shaft in the housing, at least one rolling-element bearing with an inner ring and an outer ring is attached between the housing of the motor or the electrical machine and the rotating shaft, wherein usually the inner ring is connected to the shaft such that the inner ring and the shaft rotate together, and the outer ring is connected to the housing such that the outer ring and the housing are rotationally fixed. In operation, an electrical potential difference can arise between the shaft and the housing of the motor or the electrical machine; the electrical potential difference generates an electrical current between the inner ring of the rolling-element bearing and the outer ring.

The electrical current, which then flows through the components of the rolling-element bearing, can damage these components, in particular the rolling elements and the raceways that are attached to the inner and outer ring. In addition, electrical discharges can also generate vibrations.

In order to remedy these disadvantages, it is known to replace the rolling elements of the bearing, which are manufactured from the same steel as the inner and the outer ring, with rolling elements that are manufactured from ceramic. Such a bearing is then generally referred to as a hybrid rolling-element bearing. However, such a hybrid rolling-element bearing is relatively expensive.

It is also known to attach an electrical insulation layer between bearing ring and housing.

However, disadvantageously, the presence of an electrical insulation layer in the bearing interferes with the dissipation of heat generated during operation of the bearing, and the high temperatures resulting therefrom can also damage the bearing.

SUMMARY

It is therefore an aspect of the present disclosure to provide a bearing assembly that includes electrical insulation, that can be manufactured easily and cost-effectively, and that provides improved heat dissipation as compared to other electrically insulated bearings.

A bearing assembly is disclosed that includes a bearing having a first ring and a second ring that are rotatable with respect to each other and define a bearing interior between them. Here the bearing assembly furthermore includes at least one insulation device (electrical insulator) that is associated with the first bearing ring and that includes a layer of electrical insulation disposed on the first ring.

In order to improve heat transport, the electrical insulator furthermore includes at least one heat-conducting layer made of a non-metallic material and is configured to fill at least one air-filled cavity between the electrical insulation layer and a component receiving the first bearing ring.

Here it is advantageous in particular when the heat-conducting layer is manufactured from a heat-conducting thin and soft material. Such a material can fill the cavities particularly well and thus ensure that no heat-insulating air inclusions remain between a component receiving the bearing assembly and the bearing assembly.

According to a preferred exemplary embodiment, the heat-conducting layer is a heat-conducting paste sometimes referred to as a "thermal paste" or if curable, a "thermal adhesive." Heat-conducting pastes are known, for example, from electronics, and ensure that, for example, heat that is produced by a chip is passed to surrounding components. The inventors have surprisingly detected that such a use of heat-conducting paste can also solve the heat accumulation problem in electrically insulated bearings, since here—even with a press fit—micro-air-inclusions and micro-cavities that hinder heat conduction are often present between the bearing ring or the electrical insulation layer and the receiving component. These cavities can be filled with the heat-conducting paste so that a material contact and thus heat transport is always possible. That is, while some electrical insulators are also thermally insulating, the addition of a thermal paste on the electrical insulator provides a significant improvement in heat transport and cooling of a bearing.

Here it is advantageous in particular when the heat-conducting layer is manufactured from a silicon-containing material. Silicone is predestined for such a function due to its high temperature resistance with simultaneous high heat conductivity and its flexible consistency. Thermal pastes usually include a polymerizable liquid matrix and large volume fractions of electrically insulating, but thermally conductive filler. Typical matrix materials are epoxies, silicones (silicone grease), urethanes, and acrylates. Aluminum oxide, boron nitride, zinc oxide, and aluminum nitride may be used as fillers for these types of adhesives.

Materials based on thermoplastics or thermosets form an alternative in case silicon-containing materials are not desired.

According to a further advantageous exemplary embodiment, the electrical insulation layer and the heat-conducting layer are manufactured from the same material and are formed as an integrated layer. Here the material has both heat-conducting and electrically insulating properties. This makes it possible that only one material layer need be applied, which further simplifies the manufacturing. In the alternative, the electrically insulating layer can be a first layer and the heat conducting layer can be a second layer different from the first layer.

According to a further advantageous exemplary embodiment, the electrical insulator furthermore includes an annular carrier made of a metallic carrier material that supports the at least one heat-conducting layer and surrounds the electrical insulation layer. On the one hand a bearing assembly can thereby be provided that is easy and cost-effective to manufacture. On the other hand, the annular carrier protects at least the electrical insulation layer from damage so that the electrical insulation is always ensured. Furthermore, the metal can be easily and precisely post-processed so that the annular carrier provides a precise and exact fit of the bearing assembly into a receiving component.

According to a further preferred exemplary embodiment, the heat-conducting layer is disposed between electrical insulation layer and annular carrier. The heat-conducting layer can thereby also be protected from damage. Since the carrier itself is made of metal, which has good heat conducting abilities, heat that, thanks to the heat-conducting layer, is passed from the bearing interior into the metallic carrier is easily discharged to the surrounding components.

In order to further enhance this heat-conducting ability, it can also be provided that the annular carrier is surrounded in sandwich form by two heat-conducting layers and carries them. It can thereby also be ensured that air inclusions that should be present between the annular carrier and the receiving component are reduced so that the heat conductivity is further improved.

Of course, it is also possible that the annular carrier is disposed between the electrical insulation layer and the heat-conducting layer, and carries, in sandwich form, the electrical insulation layer on one side, and the heat-conducting layer on the other side.

According to a further advantageous exemplary embodiment, the annular carrier is formed from at least one strip-shaped carrier blank bent into a ring and includes at least two abutting edges that are connected to each other in a material-bonded and/or interference-fit manner. The strip-shaped carrier blank preferably has two short edges and two long edges, wherein the abutting edges are realized by the short edges.

Alternatively, the annular carrier can of course also be manufactured from an annular carrier blank, for example, cut to length from a tube or a sleeve.

Such carrier blanks can be easily manufactured and can easily be equipped with the corresponding layer, electrical insulation layer and/or heat-conducting layer, prior to installation into the bearing assembly.

With a strip-shaped carrier blank, various sizes of annular carriers can also advantageously be provided simply by a corresponding cutting of the carrier material. A simple adapting to various sizes is thus possible. The material-bonded or interference-fit connection at the two abutting edges in turn ensures that the strip-shaped carrier blank maintains its annular shape and completely encloses the bearing ring.

Since the annular carrier must usually still be post-processed in a mechanically precise manner before the installation of the bearing in the housing, in order, for example, to make possible a press fit against a receiving component, the abutting-edge seams can be simply and cost-effectively post-processed during the post-processing step, in particular ground smooth.

According to one advantageous exemplary embodiment, the electrical insulation layer and/or the heat-conducting layer is formed-on on the carrier material or on the carrier blank, in particular adhered or overmolded onto the carrier blank. With strip-shaped carrier blanks, this forming-on can be provided both before the round-bending and after the round-bending. Furthermore, it is possible that the insulation later is applied onto the carrier material, i.e., even before the cutting. Thus, for example, a metal plate can be extensively coated with the insulation material and only in a further manufacturing step the strip-shaped carriers can be cut into the desired size. This also provides a very simple and cost-effective manufacturing method.

According to a further advantageous exemplary embodiment, the annular carrier furthermore has at least one edge bent toward the bearing interior. This edge disposed at least on one side makes possible an axially fixed seat of the annular carrier on the bearing ring and also an electrical insulation of the bearing ring also on its end sides. In this respect it is advantageous in particular when the edge extends at least partially along and end surface of the first ring. A displacement of the bearing ring in relation to the first bearing ring can thereby be avoided, at least in the axial direction.

Here it is advantageous in particular when the annular carrier has not only one, but rather two bent edges that enclose the bearing ring in a U-shaped manner. This prevents any relative axial movement between electrical insulator and bearing ring.

According to a further advantageous exemplary embodiment, the annular carrier includes a lug, aligned radially outward or radially inward, at least partially on the outer circumference, that can engage into a complementary recess in the component receiving the first bearing ring. The possibility thereby arises to fix the bearing axially in the component with the aid of the carrier, and also to secure it against rotating in the component. This lug can advantageously be formed directly from the carrier material.

If a strip-shaped carrier blank is used, according to a further advantageous exemplary embodiment, the one abutting edge can have a shape complementary to the other abutting edge. A precise mutual alignment of the abutting edges can thus already be achieved during the round-bending, and the round-bending and connecting of the abutting edges can be simplified and accelerated in terms of manufacturing technology, since a precise aligning of the abutting edges with respect to each other is effected automatically.

According to a further advantageous exemplary embodiment, the abutting edges have at least one puzzle-piece-type interference-fit connection via which the abutting edges are connected to each other at least by interference fit. This puzzle-piece-type interference-fit connection makes possible a rapid and exact connecting of the abutting edges so that an annular carrier is formed.

Of course, it is also possible that the annular carrier is not comprised of only a single strip-shaped carrier blank, but rather is composed of a plurality of individual pieces that are each connected to one another at their abutting edges. Here, as described above, the abutting edges can be connected to one another in an interference-fit and/or material-bonded manner.

According to a further advantageous exemplary embodiment, the abutting edges are in particular welded to each other. This can also be used in the above-described abutting edges connected by interference fit as additional securing against an unintentional releasing of the interference-fit connection.

A further aspect of the present invention relates to a method for the manufacturing of an above-described bearing assembly, with the following steps:
  providing a bearing with a first bearing ring and a second bearing ring,
  applying an electrical insulation layer onto the first bearing ring, and
  applying at least one heat-conducting layer onto the electrical insulation layer and/or onto an annular carrier that is configured to surround the electrical insulation layer.

Here it is preferred in particular when the electrical insulation layer and/or heat-conducting layer is applied, attached, or formed-on, in particular overmolded or adhered. Of course, the electrical insulation layer and/or heat-conducting layer can also by simply inserted without further attaching. Since the electrical insulation layer and/or heat-conducting layer can already be applied onto the carrier material prior to the applying of the annular carrier onto the bearing ring, a time- and cost-intensive injecting of carrier material into an intermediate space between bearing ring and annular carrier can be omitted. The prior application also makes possible a uniform dimensioning of the electrical insulation layer material or of the heat-conducting material on the carrier material.

If a strip-shaped carrier blank, with two opposing abutting edges that are disposed on the short sides of the strip-shaped carrier blank, and two long edges is used, the method can furthermore comprise:

round-bending the strip-shaped carrier blank into a ring such that the two abutting edges abut against each other, and joining the abutting edges in a material-bonded and/or interference-fit manner in order to provide an annular carrier.

Here the annular carrier can also be comprised of a plurality of individual strip-shaped carrier blanks that are each connected to each other at their abutting edges in a material-bonded or interference-fit manner.

The providing of a strip-shaped carrier blank made of a carrier material is preferably effected by a cutting a strip from a metal sheet (that is, cutting all four sides from a metal sheet that is longer and wider than the final blank) or cutting to length from a long sheet metal strip (that is, where the edges of the strip form the long side edges of the blank), wherein required size differences can be easily provided by correspondingly sized cut sheet metal strips. With annular carrier blanks, these can be manufactured by cutting to length from a sleeve or a tube.

According to a further advantageous exemplary embodiment, at least one of the two long edges of the annular carrier is bent toward the bearing ring so that the bent part is configured to surround, at least partially on its end side, the bearing ring on which the annular carrier is disposed, wherein the bending of the long edge can be effected before or after the round-bending of a strip-shaped carrier blank. As mentioned above, the bent edge makes possible a fixed axial seat of the electrical insulator on the bearing ring so that further attachment means of the electrical insulator onto the bearing ring can be omitted.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
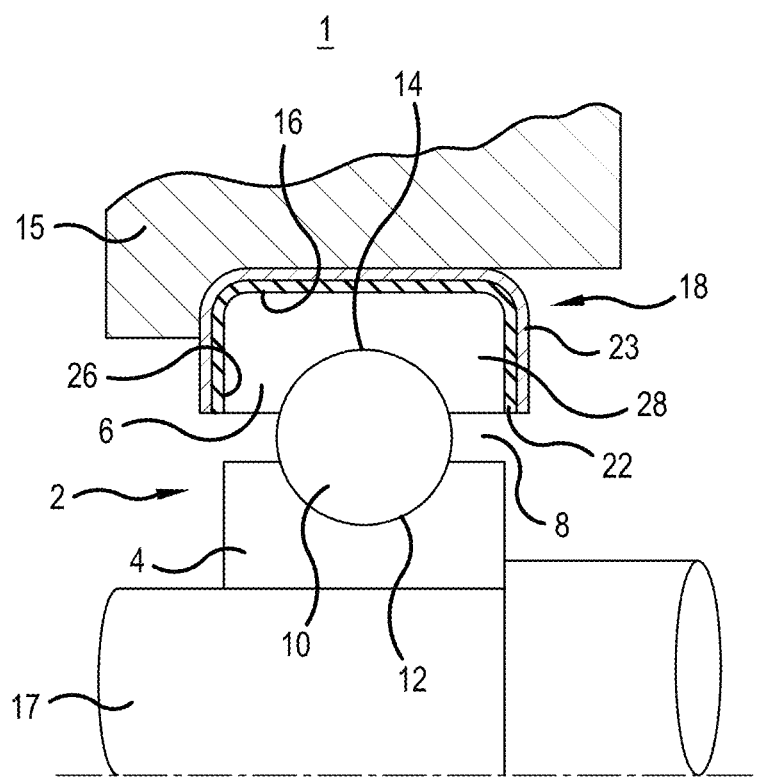
FIG. 1 is a schematic sectional view through a bearing assembly of an exemplary embodiment of the present disclosure.
Figure 2:
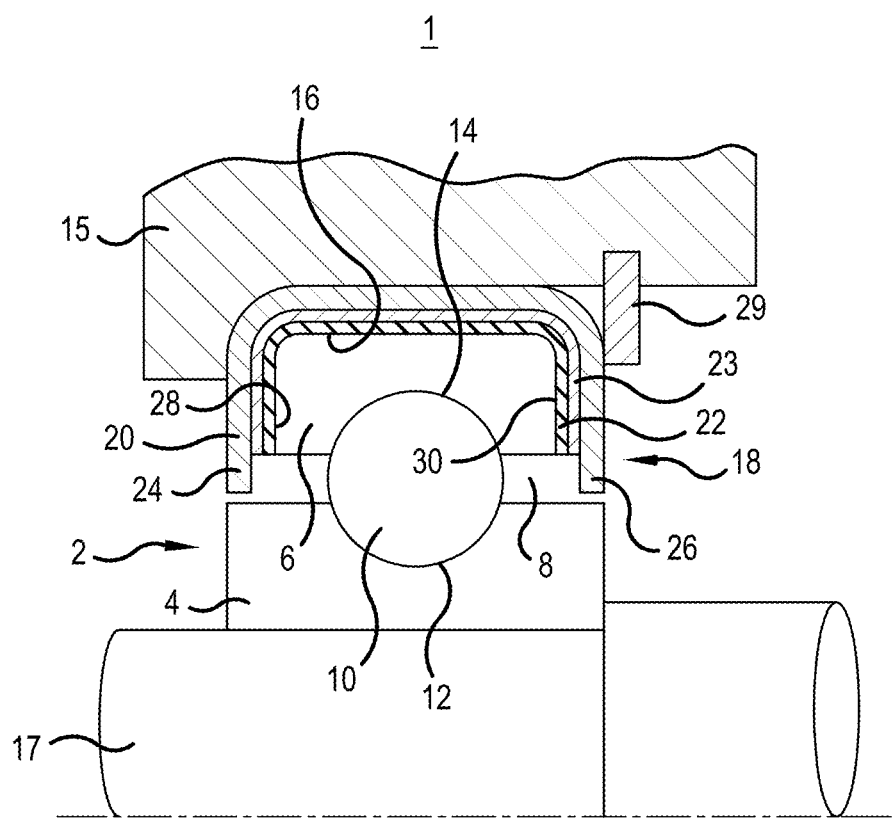
FIG. 2 is a schematic sectional view through a bearing assembly of a further exemplary embodiment of the present disclosure.

FIGS. 1 and 2 each schematically show a sectional view through a bearing assembly 1 with a rolling bearing 2 as the bearing. The rolling-element bearing 2 comprises an inner ring 4 and an outer ring 6 that form a bearing interior 8 between them in which rolling elements 10 are disposed that roll on raceways 12, 14 that are formed on the inner ring 4 and/or outer ring 6. The bearing itself with its outer ring 6 is received in a housing 15 and supports a shaft 17.

Furthermore, FIGS. 1 and 2 show that an electrical insulator 18 is present on the outer ring 6 on its outer surface 16.

In the exemplary embodiment of the FIG. 1, the electrical insulator 18 comprises an electrical insulation layer 22 on which a heat-conducting layer 23 is applied that is designed to fill the air-filled cavities (not depicted) that are present between the electrical insulation layer 22 and the housing 15 so that an improved heat transmission is achieved between the rolling- element bearing 2 and the housing 15. Micro-air-inclusions and micro-cavities are often present between the bearing ring 6 and the electrical insulating layer 22 or between the electrical insulation layer 22 and the receiving component, here the housing 15, even when a press fit is used and when some portions of these objects are in direct contact. The presence of these micro- air-inclusions and micro-cavities impairs heat conduction in electrically insulated bearings so that a heat accumulation often occurs that can damage the bearing. These cavities can be filled with the heat-conducting layer 23 so that a material contact, and thus an improved heat transport, is always possible.

Here the heat-conducting layer is preferably a heat-conducting paste, in particular based on silicone, that can be applied thinly, and due to its soft material characteristics fits well into the cavities. (The head-conducting layer is not drawn to scale in the Figures.)

Figure 6:
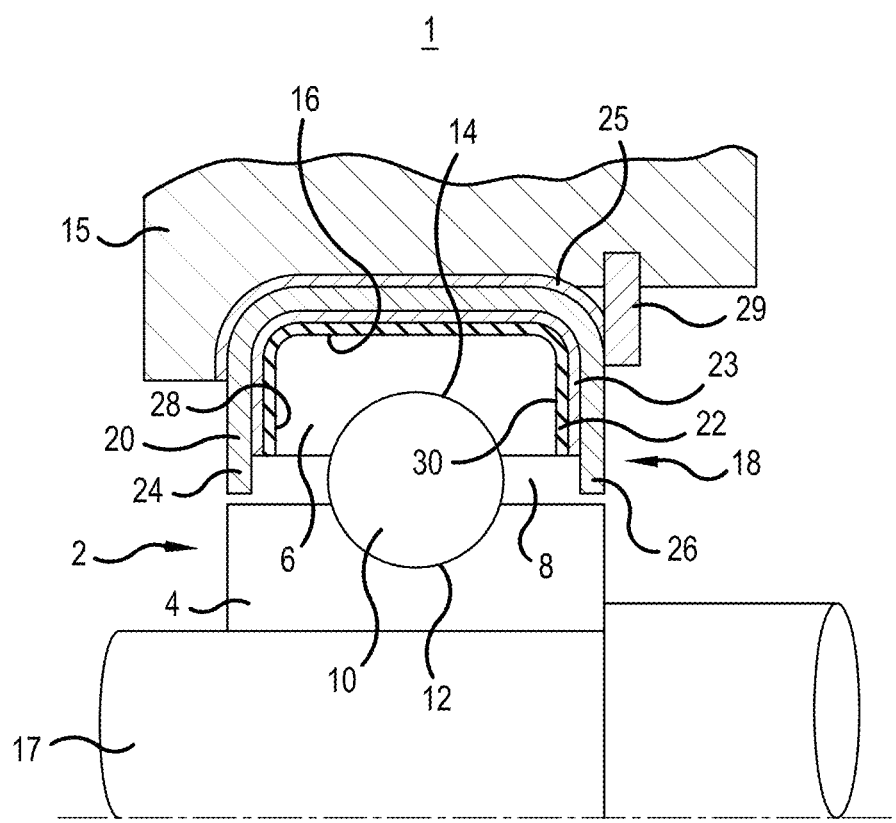
FIG. 6 is a schematic sectional view through a bearing assembly of a further exemplary embodiment of the present disclosure.

Furthermore, in order to provide a particularly good protection against damage to the electrical insulation layer 22 and the heat-conducting layer 23, as shown in the exemplary embodiment of FIG. 2 an annular carrier 20 surrounds the electrical insulation layer 22 and the heat-conducting layer 23 and contacts the housing 15 directly or via a further heat conducting layer 25, illustrated in FIG. 6.

Furthermore, FIGS. 1 and 2 show that the insulation layer 22, the heat-conducting layer 23, and/or the annular carrier 20, has a U shape with two bent edges 24, 26 that extend along end surfaces 28, 30 of the bearing outer ring 6 and axially attach the annular carrier 20 or the electrical insulator 18 to the bearing outer ring 6. FIG. 2 also shows an additional snap ring 29 that provides an additional axial securing.

Figure 3A:
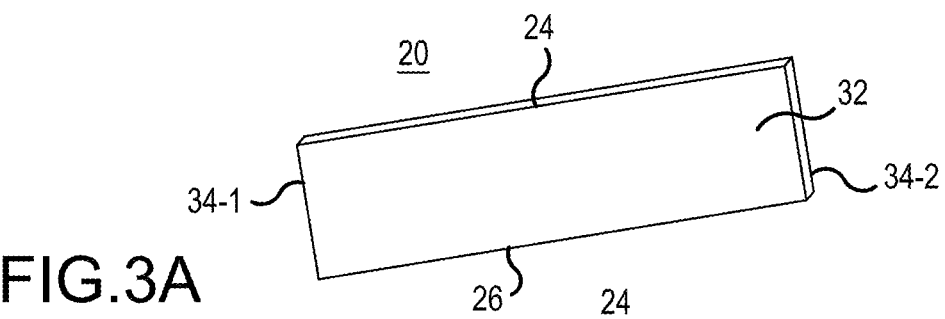
FIGS. 3A and 3B are schematic views of a strip-shaped carrier blank at different processing stages.
Figure 3B:
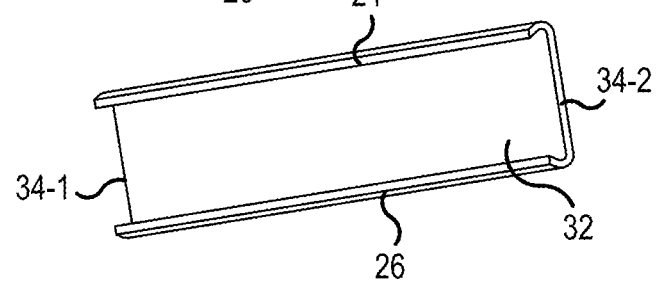

As can be seen from FIGS. 3A and 3B, the annular carrier 20 can preferably be manufactured from a strip-shaped carrier blank 32, for example, from a sheet metal strip. Here FIG. 3A shows a strip-shaped carrier ring blank 32 with two short edges 34 that function as abutting edges and two long edges 24, 26 which, as shown in figure section 3B, are bent toward inside bearing interior 8 in order to achieve the U shape of the annular carrier 20 depicted in FIG. 2. Here the bendings or flanges, shown in FIG. 2, of the edges 24, 26 can be introduced before or after a round-bending of the strip-shaped carrier blank 32 for providing the annular carrier 20. In FIG. 3, a bending of the edges 24, 26 before the round-bending is depicted.

The strip-shaped carrier blank 32 can be cut from a large-surface plate or cut down to length from a sheet metal strip, and can thus be individually adapted to the size of the bearing outer ring 6. Here the insulation material of the electrical insulation layer 22 and/or the material of the heat-conducting layer 23 can be applied onto the metal sheet before the cutting, or alternatively after the cutting so that individually produced sizes of electrical insulators 18 are easily providable.

If the electrical insulation layer 22 and/or the heat-conducting layer 23 is not already applied onto the strip-shaped carrier blank 32 or onto the metal sheet, an application of the electrical insulation layer 22 and/or of the heat-conducting layer 23 can also be effected after the bending of the edges 24, 26.

Figure 4:
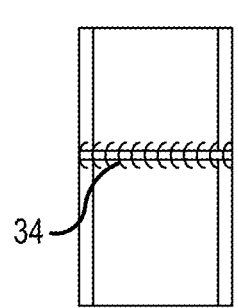
FIG. 4 is a schematic view of a material-bonded connection between ends of a strip-shaped carrier blank of a bearing assembly according to the present disclosure.

If the strip-shaped carrier blank 32 is provided with the electrical insulation layer 22 and/or the heat-conducting layer 23 and has the optional bending of the edge, the strip-shaped carrier blank 32 is round-bent around the bearing outer ring 6, and its abutting edges 34 are connected to each other in a materially bonded (see FIG. 4) or interference-fit (see FIG. 5) manner.

Figure 5:
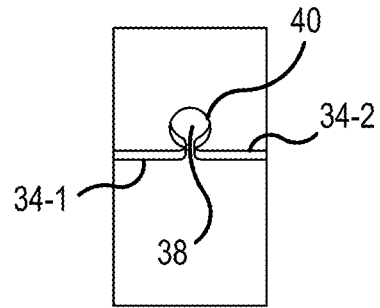
FIG. 5 is a schematic view of an interference-fit connection between ends of a strip-shaped carrier blank of a bearing assembly according to the present disclosure.

As FIG. 5 shows in particular, an interference-fit connection can be provided in the form of at least one puzzle-piece-type interference-fit connection 36 in which one of the abutting edges 34-1 has a projection 38, while the other abutting edge 34-2 has an insertion area 40 formed complementary to the projection 38, into which insertion area 40 the projection 38 can be snapped. Of course, other interference fits are also possible.

Of course, it is also possible that material bond and interference fit are combined in order to be able to achieve a particularly secure connection of the abutting edges 34 to each other.

Once the bearing ring 6 is surrounded by the electrical insulator 18, and the annular carrier 20 is connected at its abutting edges 34 in a material-bonded and/or interference-fit manner, a fine machining of the annular carrier 20 can be effected in order to achieve a precise required surface for the press fit of the bearing assembly in a housing. This fine machining of the annular carrier 20 also makes it possible that the bearing outer ring 6 itself need not be fine machined. This also reduces the manufacturing costs, since less effort is needed for a fine machining of the annular carrier 20 than for a fine machining of the rolling-element bearing outer ring 6.

Here in particular the surface of the annular carrier 20 that press fits with a receiving component, for example, a housing, is ground to its precise dimensioning, and the raceways 12, 14 of the bearing ring 6 themselves are honed. Of course, further post-processing steps are possible. The finished bearing outer ring 6 with the electrical insulator 18 can then be installed in the electric motor.

By providing at least one heat-conducting layer, the heat transport in electrically insulated bearings can be significantly improved, since air inclusions, which are inevitably present, are reduced or prevented. The electrical insulator 18 can be manufactured from a strip-shaped carrier blank 32 so that the widest range of sizes of bearing outer rings 6 can be easily be equipped with the electrical insulator 18. Individual sizes are thereby also easy to manufacture without different tube-type blanks needing to be provided or manufactured for every size of bearing. The material-bonded or interference-fit connecting also does not represent a disadvantage since the annular carrier is usually still machined prior to an installation. Any protruding welding seams can be easily removed in this step. Overall, the bearing assembly discussed above represents a simple and cost-effective way to electrically insulate a bearing disposed in an electric motor or an electrical machine.

REFERENCE NUMBER LIST

1 Bearing assembly
2 Rolling-element bearing
4 Inner ring
6 Outer ring
8 Bearing interior
10 Rolling element
12, 14 Raceways
15 Housing
16 Outer surface
17 Shaft
18 Electrical insulator
20 Annular carrier
22 Electrical insulation layer
23 Heat-conducting layer
24, 26 Bent edges
25 Further heat conducting layer
28, 30 End surfaces
29 Snap ring
32 Carrier blank
34 Abutting edges
36 Interference-fit connection
38 Projection
40 Insertion area

What is claimed is:

1. A bearing assembly comprising:
   a bearing including a first bearing ring, a second bearing ring rotatably disposed relative to the first bearing ring, and a plurality of rolling elements in a bearing interior defined by the first bearing ring and the second bearing ring, and
   at least one layer of non-metallic material on the first bearing ring configured to conduct heat away from the first bearing ring and to electrically insulate the first bearing ring and to fill at least one cavity between the first bearing ring and a component to which the first bearing ring is mounted,
   wherein the at least one layer comprises an electrically insulating first layer and a heat-conducting second layer on the first layer, and
   wherein the second layer is different than the first layer and comprises a thermal paste or a thermal adhesive.

2. The bearing assembly according to claim 1, wherein the second layer comprises silicone.

3. The bearing assembly according to claim 1, including a metal ring on the first bearing ring,
   wherein the second layer is provided between the first layer and the metal ring.

4. The bearing assembly according to claim 3,
   including an additional heat-conducting layer on a side of the metal ring opposite the second layer.

5. The bearing assembly according to claim 3,
wherein the second layer are is adhered or overmolded to the metal ring.

6. A bearing assembly comprising:
a bearing including a first bearing ring, a second bearing ring rotatably disposed relative to the first bearing ring, and a plurality of rolling elements in a bearing interior defined by the first bearing ring and the second bearing ring,
at least one layer of non-metallic material on the first bearing ring configured to conduct heat away from the first bearing ring and to electrically insulate the first bearing ring and to fill at least one cavity between the first bearing ring and a component to which the first bearing ring is mounted, and
a metal ring on the first bearing ring,
wherein the at least one layer comprises an electrically insulating first layer and a heat-conducting second layer on the first layer,
wherein the second layer is provided between the first layer and the metal ring, and
wherein the metal ring has a first flange overlying a first axial end of the first bearing ring and a second flange overlying a second axial end of the first bearing ring and wherein at least a portion of the first layer and at least a portion of the second layer are located axially between the first flange and the second flange.

7. The bearing assembly according to claim 6,
wherein the metal ring comprises a sheet metal strip having a first end connected to a second end in a materially bonded or interference fit manner at a joint.

8. The bearing assembly according to claim 7, wherein the second layer are is adhered or overmolded to the metal ring.

9. The bearing assembly according to claim 6,
wherein the second layer is different than the first layer and comprises a thermal paste or a thermal adhesive.

10. The bearing assembly according to claim 9,
including an additional heat-conducting layer on a side of the metal ring opposite the second layer.

* * * * *